United States Patent [19]

Tsuboi et al.

[11] Patent Number: 4,612,018
[45] Date of Patent: Sep. 16, 1986

[54] ULTRASONIC DEBUBBLING METHOD AND APPARATUS

[75] Inventors: Norio Tsuboi; Noboru Furukawa, both of Hino; Sadayuki Miyazawa, Hachioji, all of Japan

[73] Assignee: Konishiroku Photo Industry Co., Ltd., Japan

[21] Appl. No.: 583,348

[22] Filed: Feb. 24, 1984

[30] Foreign Application Priority Data

Feb. 28, 1983 [JP] Japan .................. 58-30965

[51] Int. Cl.$^4$ ............................. B01D 51/08
[52] U.S. Cl. ............................. 55/15; 55/277
[58] Field of Search ................... 55/15, 277

[56] References Cited

U.S. PATENT DOCUMENTS

| | | | |
|---|---|---|---|
| 3,350,843 | 11/1967 | Lloyd | 55/15 |
| 3,853,500 | 12/1974 | Gassmann et al. | 55/15 |
| 4,127,394 | 11/1978 | Verhille | 55/15 |
| 4,205,966 | 6/1980 | Horikawa | 55/15 |
| 4,428,757 | 1/1984 | Hall | 55/277 |

OTHER PUBLICATIONS

Gas Separation Schedule, p. 2, Dec. 1982.

*Primary Examiner*—Charles Hart
*Attorney, Agent, or Firm*—Finnegan, Henderson, Farabow, Garrett & Dunner

[57] ABSTRACT

A method for debubbling a liquid includes flowing the liquid into an inlet, applying high energy ultrasonic waves to the liquid inside the inlet, introducing the liquid into a debubbling chamber through the inlet and applying low-energy ultrasonic waves to the liquid in the debubbling chamber to obtain a debubbled liquid. An ultrasonic debubbling apparatus comprises a medium chamber containing a heat and ultrasonic wave transmitting medium, a debubbling chamber inside the medium chamber, an introducing pipe arranged to extend a predetermined length into the medium chamber so as to introduce the liquid to be debubbled into the debubbling chamber, a primary ultrasonic transducer for applying high energy ultrasonic waves to the liquid in the introducing pipe and a secondary ultrasonic transducer for applying low energy ultrasonic waves to the liquid in the debubbling chamber.

14 Claims, 3 Drawing Figures

ULTRASONIC DEBUBBLING METHOD AND APPARATUS

BACKGROUND OF THE INVENTION

This invention relates to an ultrasonic debubbling method and apparatus therefor.

Generally, some kinds of liquids are required to be debubbled. For example, if a light-sensitive emulsion containing bubbles is coated onto a film material such emulsion cannot be used to form an uniform light-sensitive layer on the film. The emulsion is therefore required to be debubbled before it is coated onto the film material.

An example of an apparatus for debubbling, is disclosed in Japanese Patent Examined Publication No. 6365/1982. This apparatus comprises, as shown in FIG. 1, (a) heat-retaining chamber 100; (b) debubbling chamber 103 which is dipped in this heat-retaining chamber 100 and comprises, for example, primary cylinder 101 and secondary cylinder 102 which are connected with each other in the upper part of debubbling chamber 103; (c) pipe 104 for introducing a liquid to be debubbled and (d) pipe 105 for draining the liquid debubbled, which pipes are inserted from above into cylinders 101, 102 respectively so as to nearly reach the bottoms of the cylinders; and (e) ultrasonic transducer 106 arranged at the lower part of debubbling chamber 103. In this apparatus, debubbling is performed in such a manner that liquid to be debubbled is fed from pipe 104 for introducing the liquid to be debubbled into primary cylinder 101 until the liquid level reaches the upper part of cylinder 101 and then the upper part of secondary cylinder 102. Thereafter, the liquid flows down to pipe 105 for draining the debubbled liquid and is drained through pipe 105. During the entire process from introducing to draining the liquid, ultrasonic waves are radiated from ultrasonic transducer 106 to the liquid to be debubbled so as to force bubbles to rise up to the surface by applying an ultrasonic radiation pressure. In the drawing of FIG. 1, 107 is a float and 108 is an air-relief valve.

Increasing the ultrasonic energy in an ultrasonic debubbling process is one way to increase the debubbling efficiency per unit time, i.e., the debubbling capability of the apparatus of FIG. 1. However, in this apparatus, a liquid to be debubbled in both of cylinders 101, 102 is irradiated with ultrasonic waves by means of common ultrasonic transducer 106. Therefore, new bubbles are produced because of a cavitation effect when the ultrasonic energy is increased, so that bubbles produced in secondary cylinder 102 are drained upon suction into pipe 105. As a result, the liquid which should be debubbled in a debubbling process still contains bubbles. It is therefore unable to debubble satisfactorily.

In this apparatus, a particles of sediment in a sedimental particle-containing liquid such as silver halide in a light-sensitive silver halide emulsion are apt to deposit at to the bottoms of cylinders 101, 102, if the apparatus is used for a long time. Whenever debubbling chamber 103 is cleaned to remove such depositions, pipes 104, 105 should be detached from debubbling chamber 103, and debubbling chamber 103 is also detached from heat-retaining chamber 100. Therefore, the cleaning thereof becomes troublesome, particularly with a large-sized apparatus.

SUMMARY OF THE INVENTION

It is an object of the invention to provide an ultrasonic debubbling method having a great debubbling effect.

Another object of the invention is to provide an ultrasonic debubbling apparatus having a simple structure and an effective debubbling performance.

The method of the invention is characterized in debubbling a liquid by radiating ultrasonic waves to the liquid introduced from an inlet pipe into a debubbling chamber, wherein the liquid being flowed through the inlet pipe is radiated with high-energy ultrasonic waves, while the liquid in the debubbling chamber is radiated with low-energy ultrasonic waves.

The apparatus of the invention comprises a medium chamber containing a heat and ultrasonic wave transmitting medium (hereinafter simply called a medium chamber); a debubbling chamber provided inside the medium chamber; a pipe for introducing a liquid to be debubbled into the debubbling chamber provided so as to be dipped to a predetermined depth into the ultrasonic wave transmitting medium of the medium chamber and both of a primary ultrasonic transducer and a secondary one being provided at the lower parts of the inlet pipe and the debubbling chamber, respectively.

DETAILED DESCRIPTION OF THE EMBODIMENTS

Figure 1:
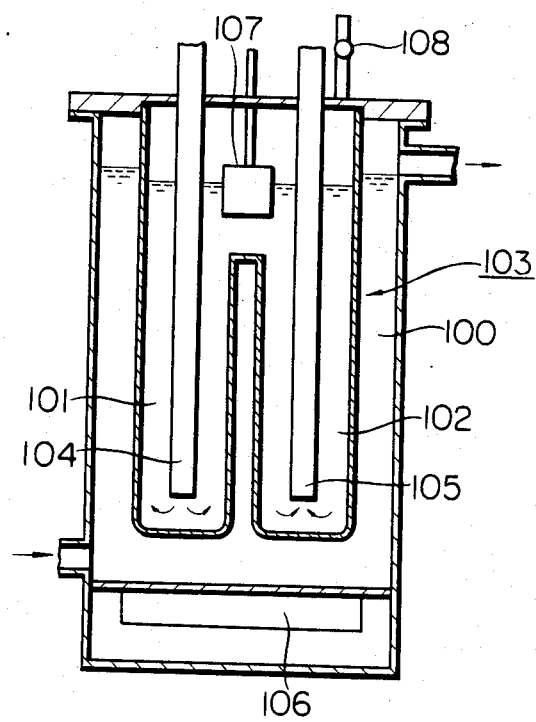
FIG. 1 is a vertical sectional view illustrating the structure of a conventional ultrasonic debubbling apparatus.
Figure 2:
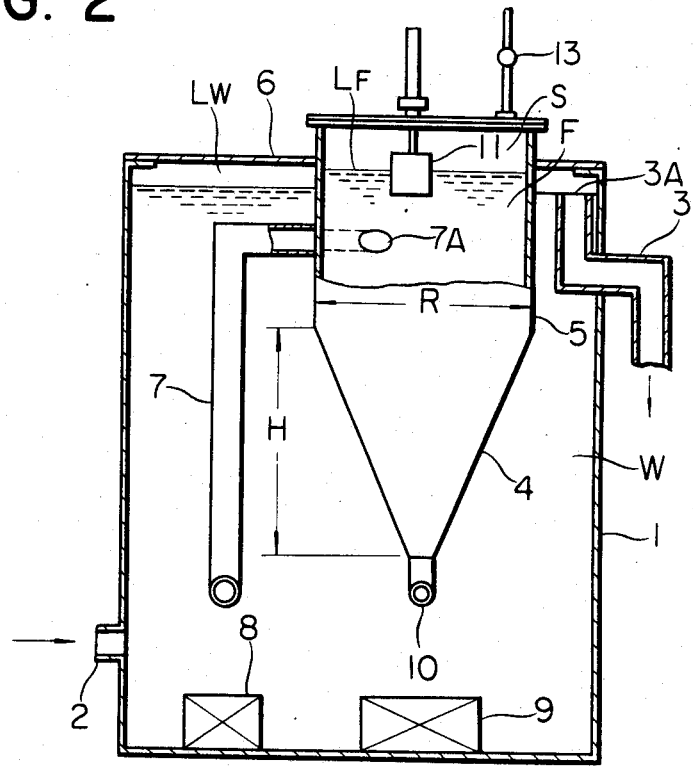
FIG. 2 is a vertical sectional view illustrating an embodiment of an ultrasonic debubbling apparatus of the invention.
Figure 3:
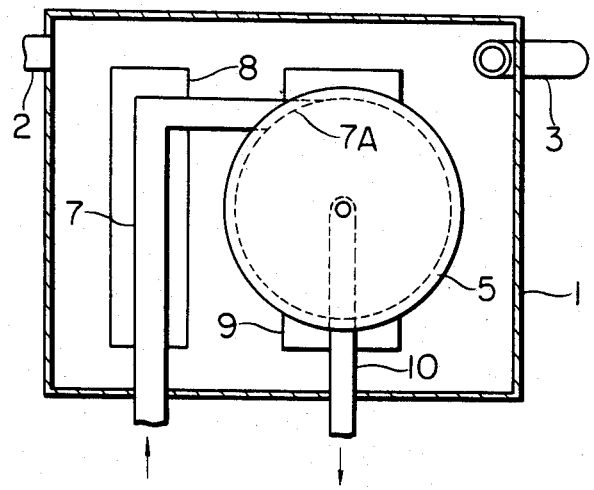
FIG. 3 is a plain view of the apparatus shown in FIG. 2, the upper parts from the level of the ultrasonic wave transmitting medium being transversely cut away for clarity.

FIGS. 2, 3 illustrate an embodiment of the ultrasonic debubbling apparatus of the invention, wherein, the numeral 1 designates a medium chamber having hot-water inlet pipe 2 and overflow outlet pipe 3 and into which hot-water W, for example, is provided as an ultrasonic wave transmitting medium capable of propagating ultrasonic waves and of keeping warm. LW indicates the surface level of hot-water W. Cylindrical debubbling chamber 5 having a circular-cone shape in the lower part thereof and expanding upward is fixed to the upper end of medium chamber 1 so as to be dipped into hot-water W except the upper end thereof. Debubbling chamber 5 may be supported by cover 6, which tightly closes the medium chamber 1 and may thus be fixed to the medium chamber 1. In debubbling chamber 5, the nozzle of debubbling liquid inlet pipe 7 is arranged to be dipped to a predetermined depth into hot-water W of medium chamber 1 and is connected with opening 7A which is provided on debubbling chamber 5 in the tangent direction and at a level lower than surface level LW of hot-water. An ultrasonic debubbling apparatus is thus constructed by providing primary ultrasonic transducer 8 and secondary one 9 into medium chamber 1 so that they may be positioned right under inlet pipe 7 and debubbling chamber 5, respectively. In the drawing, the numeral 10 designates a pipe for draining the debubbled liquid. Pipe 10 is arranged to connect to the lower end of debubbling chamber 5. A float 11 detects a liquid surface level LF of debubbling chamber 5. 13 is an air-relief valve. In FIG. 3, some parts of the ultrasonic debubbling apparatus are omitted therefrom, because the upper part thereof is cut away.

In the apparatus illustrated in FIG. 2, lower part 4 of debubbling chamber 5 is desirably to be formed so that height H thereof may be greater than inner diameter R thereof. Thus any liquid turbulent flow in debubbling chamber 5 can be prevented. As for the primary and secondary ultrasonic transducers, a water-proof type ultrasonic transducer having a piezoelectric crystal made of lead zirconate titanate, for example, may preferably be used. It is desired to separate both ultrasonic transducers 8, 9 from inlet pipe 7 and debubbling chamber 5 by more than 150 mm so that any erosion may be prevented from affecting either pipe 7 or debubbling chamber 5.

In this invention, a liquid is debubbled by means of apparatus such as described above in such a manner as follows:

At first, hot water, for example is supplied, as a heat retaining medium, from hot-water supply pipe 2 into medium chamber 1 to overflow from overflow outlet 3A of outlet pipe 3 so that surface level Lw of hot water W is thereby maintained to the level of overflow outlet 3A. Pipe 7 for introducing a liquid to be debubbled and debubbling chamber 5, except the upper part thereof, are dipped into the hot water; and then, primary and secondary ultrasonic transducers 8, 9 are driven.

Next, the liquid to be debubbled is supplied from introducing pipe 7 into debubbling chamber 5 as air-relief valve 13 remains opened. At this time, the level of a part on the down-stream side of outlet pipe 10 is kept higher than a prescribed liquid surface level, and debubbling chamber 5 is getting filled with liquid F to be debubbled. When liquid surface level LF is detected to reach the prescribed level by float 11, air-relief valve 13 is closed to close debubbling chamber 5 air tight. Thereafter, the internal pressure of debubbling chamber 5 and the pressure of outlet pipe 10 become the same. Then an amount of debubbled liquid is drained from outlet pipe 10 equal to the amount of liquid introduced from introducing pipe 7 into debubbling chamber 5. Thus, liquid to be debubbled is continuously flowed through debubbling chamber 5.

High-energy ultrasonic waves of not lower than 0.35 W/cm² for example, are generated by driving primary ultrasonic oscillator 8 powerfully to radiate the liquid to be debubbled in introducing pipe 7, and a cavitation is thereby produced. On the other hand, low-energy ultrasonic was of not higher than 0.35 W/cm² for example, are generated by driving secondary ultrasonic transducer 9 relatively less powerfully to radiate the liquid to be debubbled in debubbling chamber 5, and thus a debubbling is performed without producing any cavitation.

According to the method of the present invention debubbling is performed in the following manner. Liquid to be debubbled is first radiated by high-energy ultrasonic waves when the liquid passes through introducing pipe 7 toward debubbling chamber 5. A cavitation is thereby produced such that the bubbles of the liquid to be debubbled are cohered together or cohered with the bubbles produced by the cavitation to form large-sized bubbles. These cohered bubbles are flowed together with the liquid to be debubbled into debubbling chamber 5. The relatively larger bubbles rise up to the surface of the liquid by their own buoyancy and separate from the liquid to be debubbled. Liquid F to be debubbled in debubbling chamber 5 is radiated with low-energy ultrasoic waves generated by secondary ultrasonic transducer 9, so that an upward force is applied to the cohered bubbled by the radiation pressure of the ultrasonic waves. Therefore, the cohered bubbles are accelerated toward the liquid surface, and even a bubble unable to rise by its own buoyance is raised to the liquid surface by the radiation pressure, so as to separate from the liquid. Consequently liquids to be debubbled can be debubbled effectively.

There are not any new bubbles produced in liquid F because no cavitation is produced. It is therefore possible to prevent any bubbles from mixing into a liquid drained from outlet pipe 10.

When the volume of upper space S of debubbling chamber 5 is increased by continuing debubbling operations, liquid surface level LF is lowered and air-relief valve 13 is opened by float 11 so that pressure is released. At the reduced pressure liquid surface level LF is raised, air-relief valve 13 is closed at a defined position, and the debubbling operations are thus repeated.

In the above-mentioned processes, ultrasonic waves generated by primary ultrasonic transducer 8 are those having energy of more than the so-called limiting intensity, which produce cavitation in a liquid to be debubbled, and ultrasonic waves generated by secondary ultrasonic transducer 9 are those having energy less than the limiting intensity. The limiting intensity value is varied according to pressure and temperatures. The value of 0.35 W/cm² is the limiting intensity at a normal atmosphere.

The velocity of the downward flow of liquid F to be debubbled in debubbling chamber 5 is controlled so as not to hinder the rise of bubbles to the liquid surface. In practice, the velocity of flow may be set at the rate of the order of 0.1 to 0.5 cm/sec., when the viscosity of a liquid to be debubbled is 10 to 50 cp.

In this invention, high-energy ultrasonic waves are radiated into introducing pipe 7, which is arranged to be at a predetermined length into medium chamber 1. This radiation does not induce any other bad effect, and it is therefore possible to increase the energy of the ultrasonic waves. Accordingly, a great debubbling effect can be obtained. In addition, bubbles are cohered together in introducing pipe 7 but are not forced to the surface of liquid. It is not, therefore, required to use any tank having a wide bottom area, but may be enough to use debubbling chamber 5 to collectively serve as a chamber for debubbling. Consequently as compared with the conventional double-chamber type debubbling apparatus, the present invention uses a single-chamber debubbling chamber without the first chamber of the double-chamber type. The single chamber eliminates a process-loss of a dead liquid-flow that unavoidably is caused by the change in the direction of a liquid flow in the first chamber of a conventional double-chamber. Moreover, the structure of the apparatus of the invention may be made smaller in the occupied installation area and volumes than the prior art double-chamber apparatus.

The flux velocity of a liquid to be debubbled is lowered only in the debubbling chamber, as described above. It is therefore possible to reduce precipitate accumulation and to prevent troubles caused by such precipitates. As in the example shown in the drawing, when the lower part 4 of debubbling chamber 5 is formed so as to expand upward, the cleaning thereof may be readily performed.

As in the example shown in the drawing, a liquid to be debubbled is preferably flowed from introducing pipe 7 into debubbling chamber 5 along the tangent direction of the debubbling chamber 5, because it is prevented thereby from forming a short cut flow of liquid into the debubbling chamber 5.

Although the invention has been described in its preferred embodiment with a certain degree of particularity, it is understood that the present disclosure of the preferred embodiment can be changed in the details of construction, and the combination and arrangement of parts may be resorted to without departing from the spirit and the scope of the invention as hereinafter claimed. For example, it is feasible to provide a medium chamber into which introducing pipe 7 is arranged, separately from another medium chamber to which debubbling chamber 5 is positioned or, to use a crooked pipe such as a spiral or corrugated pipe to serve as introducing pipe 7. In these cases, the predetermined length of an introducing pipe is not required to be very long, provided that ultrasonic waves generated by primary ultrasonic oscillator 8 were great in intensity.

Next, referring to a concrete example of the invention, an ultrasonic debubbling apparatus constructed in accordance with the example shown in the drawing was used to debubble under the following conditions and to increase the flow rate of liquid to be debubbled, so that the maximum limiting flux velocity might be obtained at which bubbles did not appear in a liquid to be debubbled which was flowed from an outlet pipe. The result was at the rate of 9.4 l per min.

[The debubbling conditions]

Hot-water in the medium chamber:
Temperature: 38° C.
Flow rate: 0.5 l per min.
Liquid to be debubbled:
Composition: 6% by weight of gelatin solution
Viscosity: 30 cp
Bubble contents: 3 cm$^3$/100 cm$^3$ According to the invention as described above, a debubbling operation can be accomplished by using a simply constructed means, in a simple method, and at a great debubbling efficiency.

What is claimed is:
1. A method for removing entrained bubbles from a liquid flowed through an inlet means and a debubbling chamber situated within a heat and ultrasonic transmitting medium comprising:
   flowing said liquid into said inlet means and further introducing said liquid into said debubbling chamber through said inlet means,
   applying high-energy ultrasonic waves to said liquid inside said inlet means to generate cavitation bubbles in the liquid and to produce coherent groups of entrained and cavitation bubbles, wherein said high-energy waves have an intensity capable of producing cavitation in the liquid to be debubbled, and
   applying low-energy ultrasonic waves to said liquid in said debubbling chamber to force bubbles out of the liquid by the radiation pressure of the low-energy ultrasonic waves without producing cavitation, wherein said low-energy waves have an intensity incapable of producing cavitation in the liquid to be debubbled.

2. The method of claim 1, wherein said liquid is introduced from said inlet means into said debubbling chamber along a tangent direction of said debubbling chamber.

3. The method of claim 1, wherein an ultrasonic wave transmitting medium is used so as to transmit said ultrasonic waves to the liquid to be debubbled.

4. The method of claim 3, wherein said ultrasonic wave transmitting medium is hot-water.

5. The method of claim 4, wherein said ultrasonic wave transmitting medium is commonly used for both the ultrasonic waves.

6. The method of claim 1, wherein said high-energy ultrasonic waves have an intensity of not lower than 0.35 W/cm$^2$ and said low-energy ultrasonic waves have an intensity of not higher than 0.35 W/cm$^2$ at a normal atmosphere.

7. An ultrasonic debubbling apparatus comprising:
   a medium chamber containing a heat and ultrasonic wave transmitting medium,
   a debubbling chamber provided inside said medium chamber,
   an introducing pipe arranged to extend a predetermined length into said medium chamber so as to introduce a liquid to be debubbled into said debubbling chamber,
   a primary ultrasonic transducer means for radiating the liquid in the introducing pipe with high energy ultrasonic waves for producing cavitation in the liquid to generate cavitation bubbles and to produce coherent groups of entrained and cavitation bubbles, and
   a secondary ultrasonic transducer means for radiating the liquid in the debubbling chamber with low energy ultrasonic waves for forcing bubbles out of the liquid by the radiation pressure of the low-energy ultrasonic waves without producing cavitation.

8. The ultrasonic debubbling apparatus of claim 7, wherein said primary and secondary ultrasonic transducers are located under said introducing pipe and said debubbling chamber, respectively.

9. The ultrasonic debubbling apparatus of claim 7, wherein the lower part of the debubbling chamber is in the form of a circular cone expanding upward.

10. The ultrasonic debubbling apparatus of claim 9, wherein the height of the circular cone expanding upward of the debubbling chamber is greater than the diameter thereof.

11. The ultrasonic debubbling apparatus of claim 7, wherein said introducing pipe is connected to said debubbling chamber along the tangent line touching on the transverse section of said debubbling chamber.

12. The ultrasonic debubbling apparatus of claim 7, wherein said primary and secondary ultrasonic transducers are waterproof type having a piezoelectric crystal.

13. The ultrasonic debubbling apparatus of claim 7, wherein said primary and secondary ultrasonic transducers are separated from said introducing pipe and said debubbling chamber farther than 150 mm, respectively.

14. The ultrasonic debubbling apparatus of claim 7, wherein said apparatus further comprises a float for detecting a liquid level in the debubbling chamber and an air relief valve for releasing an air inside said debubbling chamber, so that said liquid level is kept constant by coupling said float to said air-relief valve.

* * * * *